Oct. 25, 1966  J. M. DREES ET AL  3,280,918
ROTOR CONSTRUCTION
Filed April 26, 1965　　　　　　　　　　　7 Sheets-Sheet 1
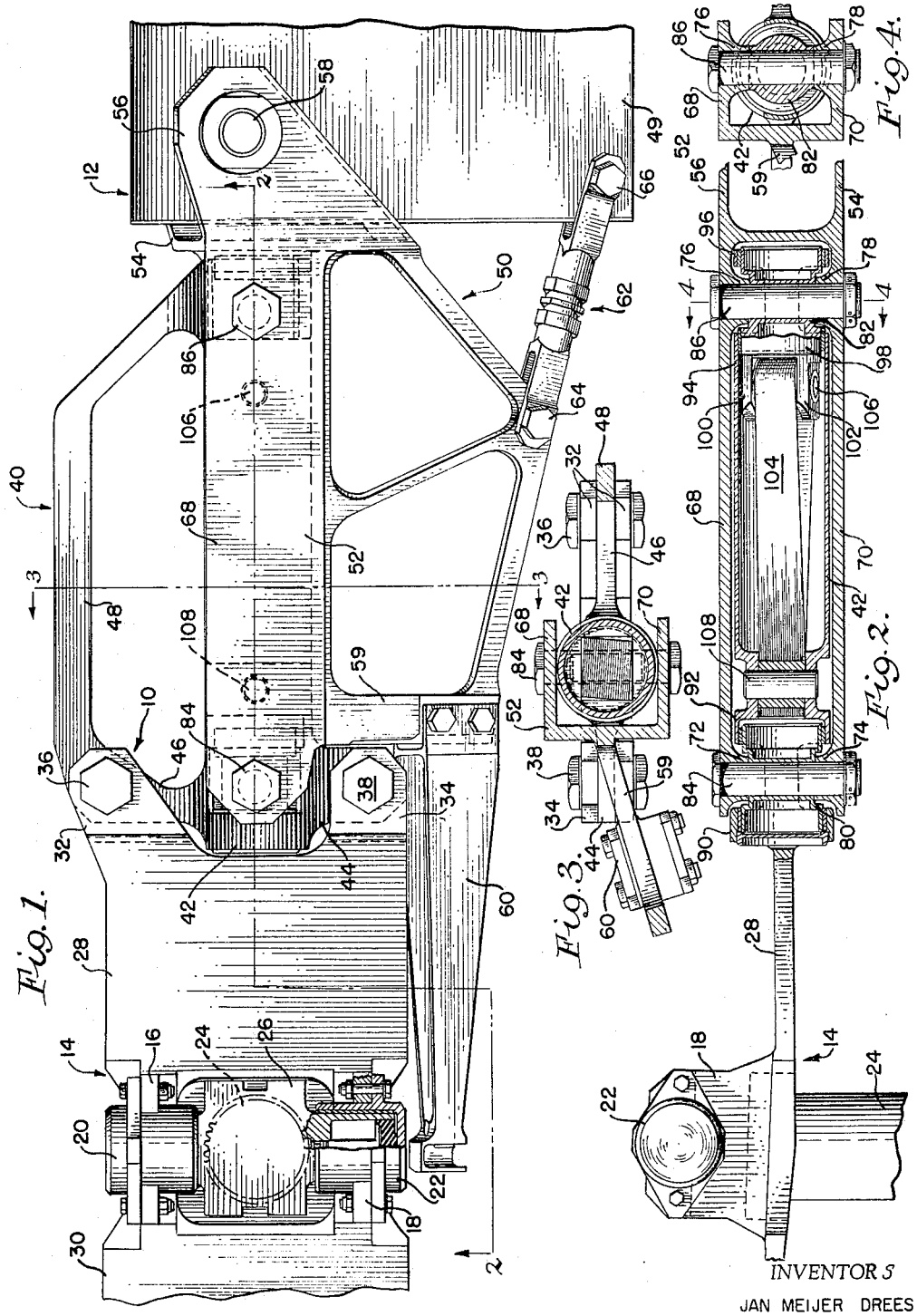
INVENTORS
JAN MEIJER DREES
ROBERT W. METZGER
BY
Bean, Brooks, Buckley & Bean
ATTORNEYS

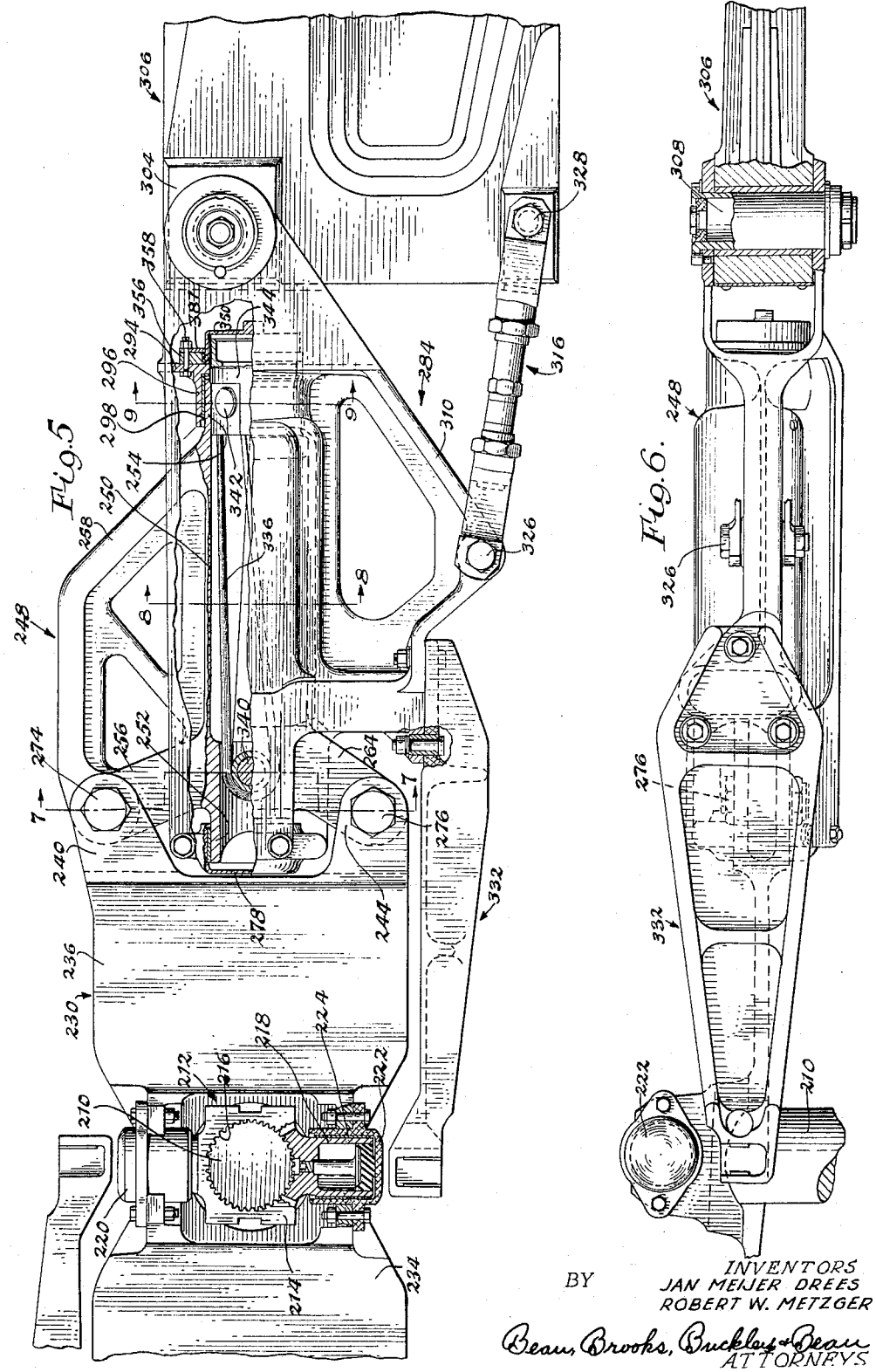

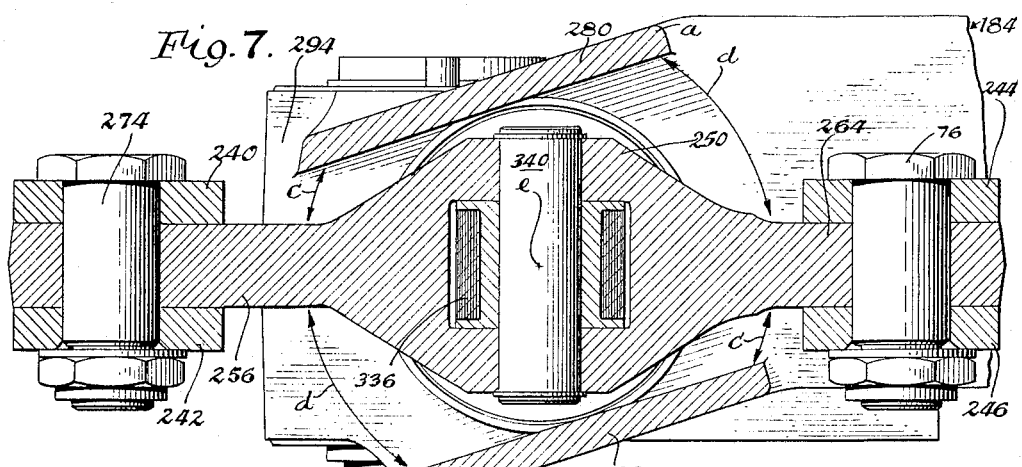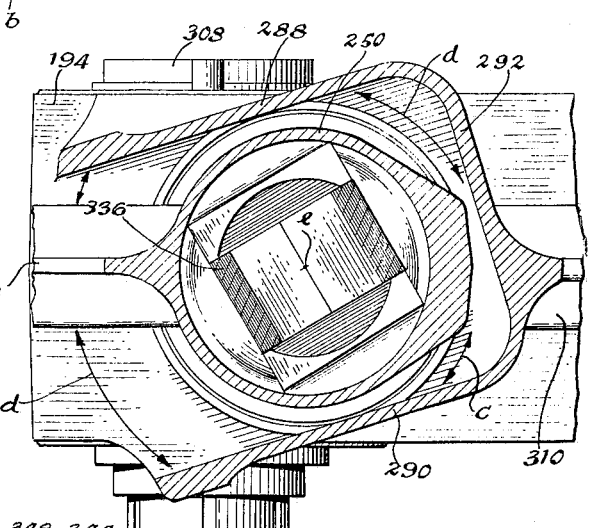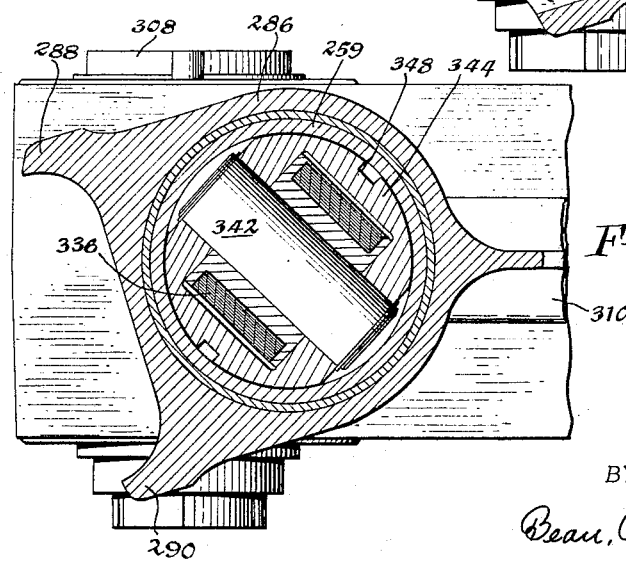

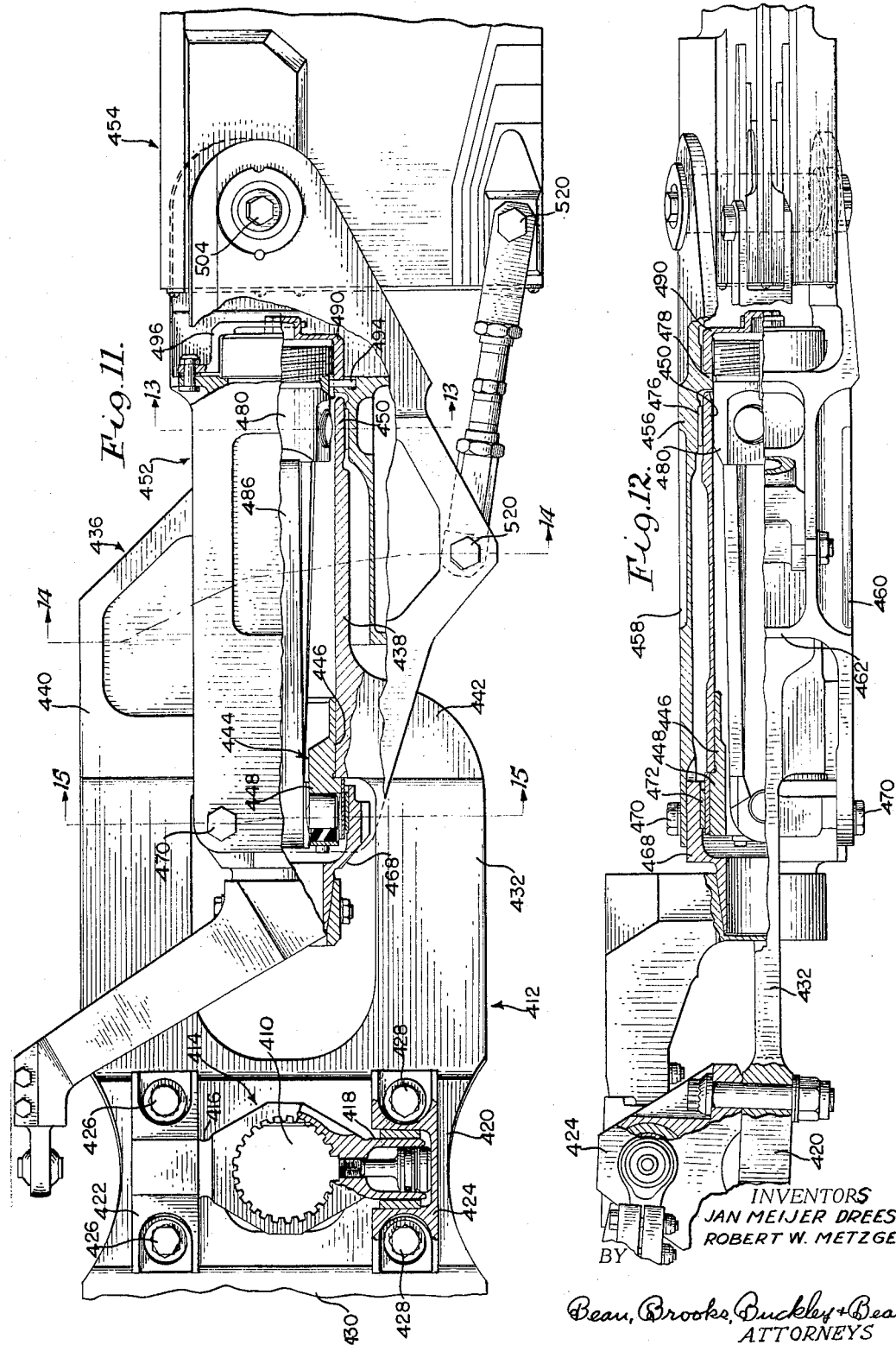

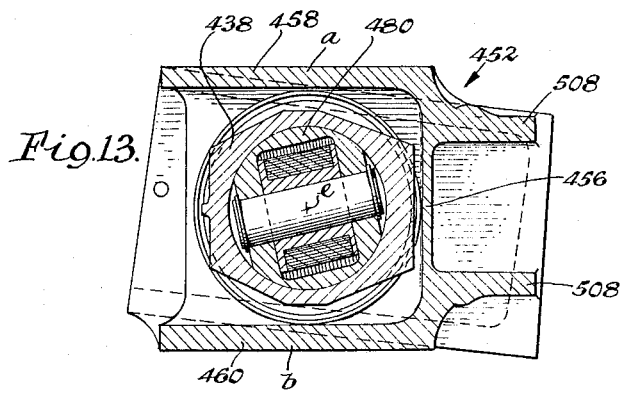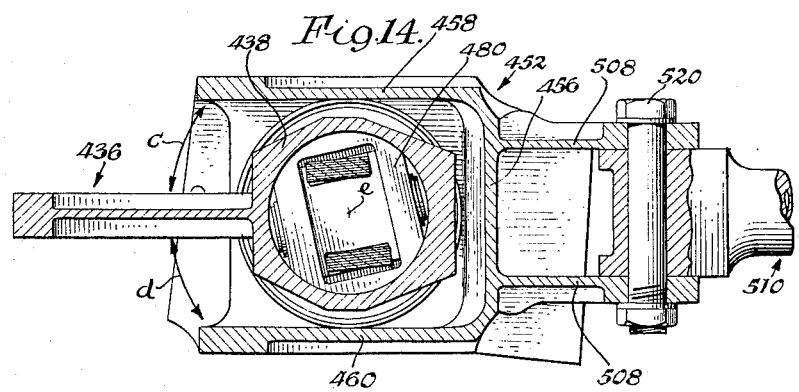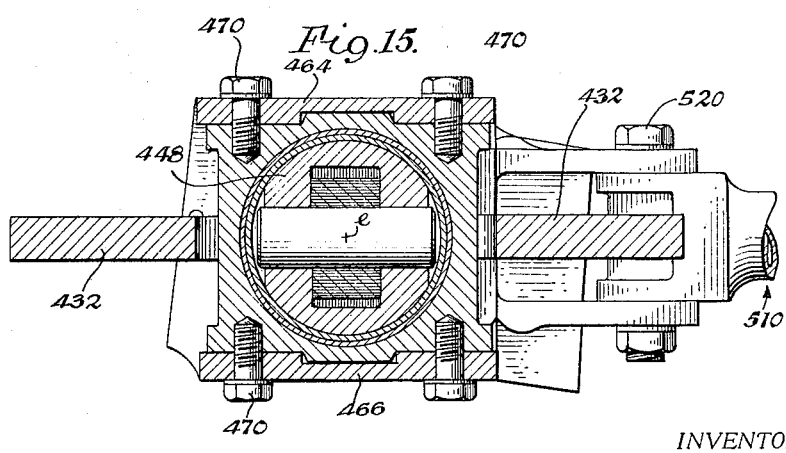

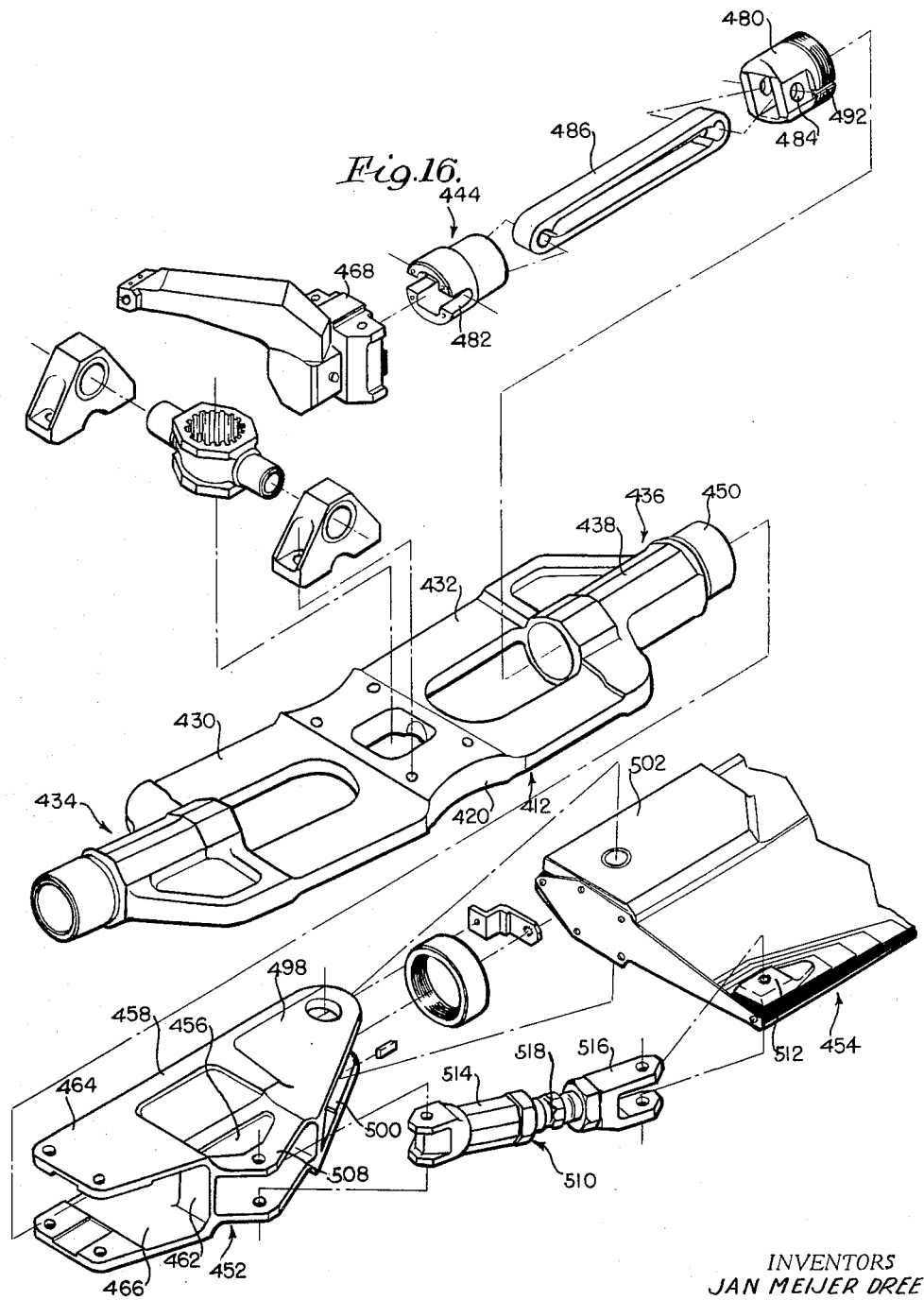

United States Patent Office 3,280,918
Patented Oct. 25, 1966

3,280,918
ROTOR CONSTRUCTION
Jan Meijer Drees, Dallas, and Robert W. Metzger, Fort Worth, Tex., assignors to Bell Aerospace Corporation, Wheatfield, N.Y.
Filed Apr. 26, 1965, Ser. No. 454,766
17 Claims. (Cl. 170—160.58)

This invention relates to rotary wing aircraft, and in particular, relates to certain improvements in the rotor systems thereof; this application being a continuation-in-part of our copending application Serial No. 258,773, filed February 15, 1963, now abandoned.

The operation of a helicopter rotor system inherently produces periodic forces acting both in the plane of rotor rotation (essentially chordwise of the rotor blades) and perpendicular thereto (essentially beamwise of the blades). The magnitudes of these forces depend, among other things, upon the translational speed of the aircraft. As a consequence, the maximum speed at which a helicopter may with practicality be operated is frequently limited to that just below the speed at which the magnitudes of these periodic or vibrational forces grow to such values as would tend to exert dangerous or destructive loads on the aircraft.

For rotor systems which employ no lead-lag hinges, minimization of chordwise periodic forces and consequently the successful design of a high performance rotor system such as is contemplated herein requires a degree of chordwise stiffness which is not practically attainable with conventional constructions. The reason for this is that, in conventional constructions, the area or region at which the rotor blades are attached to the hub to permit of the requisite pitch change motion of the blades relative to the hub becomes a limiting factor insofar as attainment of the requisite chordwise stiffness is concerned. That is to say, the mere increase in chordwise dimension in this region for the purpose of increasing chordwise rigidity will, with previously known constructions, introduce other problems which render this solution impracticable.

We have discovered that if the pitch change attachment region, as aforesaid, is constructed so as to minimize the chordwise overlap of the respective hub and blade (or blade attachment) portions, so that these portions are at least predominantly in chordwise side-by-side relation, a rotor system may be successfully constructed which will materially increase the maximum speed capabilities of the helicopter with which it is associated without introducing the ancillary problems attendant upon the mere extension of prior art constructions. In effect, the pitch change attachment region according to this invention is characterized by a construction in which the chordwise stiffness of this region may be varied substantially independently of the beamwise stiffness thereof. In this way, each of the beamwise and chordwise stiffness of this region may be separately controlled to obtain optimum results in the respective beamwise and chordwise planes without the restraint of compromise between these conditions which would otherwise prevail were these two stiffness considerations directly and mutually dependent.

It is, therefore, a principal object of this invention to provide an improved rotor system wherein the region of pitch change attachment between rotor blade and hub is constructed such as to render the chordwise stiffness of this region largely independent of the beamwise stiffness thereof.

Another object of this invention resides in an improved rotor system wherein the pitch change attachment region as aforesaid employs hub and blade attachment portions which are overlapped in the chordwise plane only in the intermediate area of the pitch change axis and wherein such overlapped portions and closely adjacent areas only are responsible for the major portion of the beamwise stiffness characteristics, and wherein chordwise projecting and generally oppositely extending webs of the respective hub and blade attachment portions are utilized to effect the requisite chordwise stiffness without contributing substantially to the beamwise stiffness of the region.

The preceding objects inherently allow the in-plane profile (beamwise thickness) of the pitch change attachment region to be maintained within reasonable limits, so that excessive weight and aerodynamic resistance is not encountered, while the requisite amount of pitch change motion is also possible. Another object of this invention, therefore, is to provide a rotor system as aforesaid in which the chordwise stiffness of the pitch change attachment region substantially exceeds the beamwise stiffness thereof so that, insofar as the chordwise plane is concerned, the effect of increased structural rigidity may be employed to diminish the periodic forces acting in this plane and thereby allow for greater speed capabilities.

The situation with regard to beamwise periodic forces is somewhat different from the chordwise case inasmuch as a rotor blade will inherently possess substantially greater chordwise stiffness than beamwise stiffness due to its airfoil shape. Thus, the rotor system with which we are concerned is inherently limited as to beamwise stiffness which, of course, is exactly compatible with the foregoing objects of this invention (i.e., low in-plane profile of the pitch change bearing area necessarily implies relatively low beamwise stiffness in this region). That is to say, since the opportunity for decreasing the magnitude of periodic forces by increased structural stiffness is not readily available in the beamwise case because the rotor blades themselves are limited in beamwise stiffness minimizing weight and in-plane profile of the pitch change bearing area is entirely valid since the beamwise stiffness of the pitch change bearing area need only be compatible with and not grossly greater than the beamwise stiffness of adjacent portions of the rotor blades. Beneficial results can be obtained for the beamwise case by concentrating weight at or near the tips of the rotor blades. The result is to produce a greater flapwise moment of inertia of the blades and, as a consequence, a greater centrifugal "straightening" effect on the rotor blades (for any given rotor angular velocity) which tends to decrease the magnitude of the periodic beamwise forces. Although such a rotor system (hereinafter termed a "high inertia" rotor system) will obviously also require great chordwise stiffness, this, to,, is exactly compatible with the foregoing objects of the present invention, for the chordwise stiffness may easily be increased to accommodate the high inertia rotor system. Thus, it will be appreciated that it is another principal object of this invention to provide a pitch change mounting assembly embodying high chordwise stiffness and relatively low beamwise stiffness (low in-plane profile), in combination with a high inertia rotor system. In this way, further significant increase in the available maximum speed of a helicopter may be realized.

Further diminishment of beamwise periodic forces may be realized by employing the principles set forth in Patent No. 3,026,942 wherein each rotor blade includes in its mounting, an area of very low beamwise stiffness. Thus, it is a further object of this invention to provide an improved rotor system employing a pitch change bearing mounting arrangement possessing substantially greater chordwise stiffness than beamwise stiffness in conjunction with a hub portion disposed between the pitch change bearing area and the center of rotation which is of substantially less beamwise stiffness than the pitch change bearing area.

As a rotor system may be limited in its translatory speed by increasing vertical thrust pulsations that accompany higher translatory speeds, an object of this invention is to provide for an increase in the available maximum speed of the helicopter.

From the above objects of this invention it will be clear that with the present invention a rotor may significantly benefit from a conversion to a high inertia system employing relatively low beamwise softness close to the center of rotation which arrangement, in turn, blends admirably with a pitch change method that permits variations in chordwise stiffness that does not significantly affect beamwise stiffness while, at the same time, allowing a relatively nonrestricted or wide range of pitch angle change.

Other objects and advantages of the invention will appear from the specification hereinafter and the accompanying drawings, wherein:

FIG. 1 is a plan view showing a portion of a rotor system constructed in accordance with the present invention;

FIG. 2 is an elevational view, partly in section, as indicated by section line 2—2 in FIGURE 1 illustrating certain details of the internal construction of the rotor system;

FIG. 3 is a transverse section taken substantially along the plane of section line 3—3 in FIGURE 1;

FIG. 4 is a vertical section taken substantially along the plane of section line 4—4 in FIGURE 2 showing further details of construction;

FIG. 5 is a plan view partially in section illustrating a modified rotor hub assembly and blade attachment means according to the present invention;

FIG. 6 is an elevational view of the assembly shown in FIGURE 5, a portion being in section, and illustrating the low profile or frontal area afforded by the construction;

FIG. 7 is an enlarged transverse section taken substantially along section line 7—7 in FIGURE 5 and showing the relative disposition of the flexure plate extension and the blade grip member and the connection at one end of the tension-torsion device;

FIG. 8 is an enlarged transverse section taken as indicated by section line 8—8 in FIGURE 5 showing further details of the assembly;

FIG. 9 is an enlarged transverse sectional view taken along the plane of section line 9—9 in FIGURE 5 and showing the connection at the other end of the tension-torsion device;

FIG. 11 is a plan view partly in section illustrating the rotor hub and blade mounting construction according to a further modification of the present invention;

FIG. 12 is an elevational view partly in section of the assembly shown in FIGURE 11;

FIG. 13 is a transverse section taken substantially along the plane of section line 13—13 in FIGURE 11 and showing details of the blade grip mounting extension, blade grip and tension-torsion device;

FIG. 14 is an enlarged section taken along the plane of section line 14—14 in FIGURE 11 showing further details of the blade grip mounting extension, blade grip and tension-torsion device;

FIG. 15 is an enlarged transverse section taken substantially along the plane of section line 15—15 in FIGURE 11 and illustrating the fixed connection for the tension-torsion device; and FIG. 16 is an exploded perspective view of the modification according to FIGURE 10.

Figure 10:
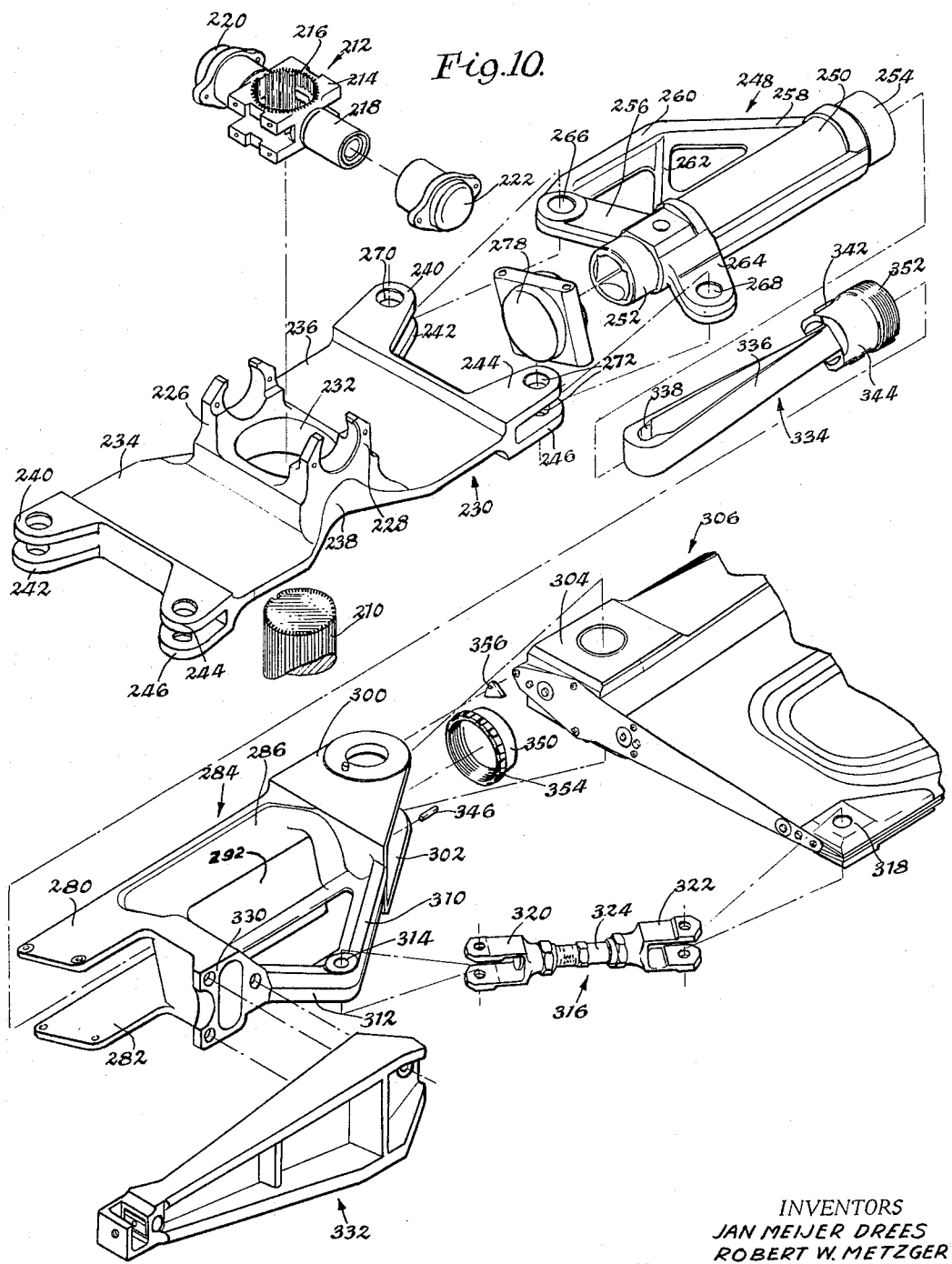
FIG. 10 is an exploded perspective view illustrating the hub assembly, its mast attachment means, and the blade mounting mechanism in accord with the modification of FIGURE 5.

Referring more particularly to FIGURE 1, the rotor hub assembly is designated therein generally by the reference character 10 and the rotor blade assembly is indicated therein generally by the reference character 12. The rotor hub assembly includes the main member 14 provided with any suitable means such as the upstanding ears 16 and 18 which mount trunnion member 20 and 22 by means of which the rotor hub assembly is pivotally mounted for transverse or "seesaw" motion relative to the rotor mast 24, the trunnion assembly including a member 26 splined or otherwise drivingly connected to the mast 24 in a manner which will be understood by those skilled in the art.

The member 14 includes, further, in addition to the portion thereof which is attached to the mast 24, one or more (one for each blade of the rotor) outwardly projecting plate-like portions as shown at 28, 30; each of which in the specific embodiment shown in FIGURE 1 is provided with a pair of transversely spaced bifurcated portions 32 and 34 which, in association with suitable fasteners 36 and 38 mount the outboard blade carrier assembly which is indicated generally by the reference character 40. As can be best seen in FIGURES 1, 2 and 3, the assembly 40 includes a tubular side portion 42 having, at its inner end, a lateral wing 44 for engagement by the fastener 38 and to be disposed between the bifurcated plate portion 34, and an opposite wing portion 46 engaged by the fastener 36 and the associated bifurcated plate portion 32. The wing 46 is provided with a brace extension 48 which integrally joins with the outer end of the tubular portion 42, substantially as is shown.

The rotor blade assembly 12 includes, in addition to the rotor blade 49 proper (FIGURE 1), a blade grip member indicated generally by the reference character 50. The blade grip member 50 includes a main body portion 52 which is of channel shaped configuration as is shown best in FIGURE 3, terminating at its outer end in a bifurcated portion presenting the spaced legs 54 and 56 which grip the root end of the rotor blade 49 therebetween; there being a suitable fastening assembly 58 projecting through these legs and the blade substantially as is shown. The blade grip member includes also a laterally projecting web portion 59 to which a pitch change horn 60 is secured and which also cooperates with an adjustable length drag brace member 62 which extends between such web portion and the trailing edge of the rotor blade 49, being secured to these respective members by the fasteners 64 and 66, substantially as is shown.

The two legs 68 and 70 of the channel portion 52 straddle the tubular portion 42 of the assembly 40; such relationship being best shown in FIGURES 2, 3 and 4. The opposite end portions of the tubular portion 42 are provided with upper and lower circumferentially extending slots and the legs 68 and 70 are provided with inwardly directed boss portions 72, 74 and 76, 78 projecting through these slots to seat upon reduced portions of respective bearing thimbles 80 and 82. Suitable fastening pins 84 and 86 project through these boss portions and the respective thimbles to securely anchor such thimbles to the channel portion 52, substantially as is shown in FIGURE 2. The bearing thimble 80 is journalled within the bearing boss portions 90 and 92 provided at the inner end of the tubular portion 42 by the aforementioned circumferentially extending slots and the thimble 82 is journalled in bearing boss portions 94 and 96 of the tubular portion 42, substantially as is shown and it will be noted that the thimble 82 is provided with an inwardly projecting extension 98 (FIGURE 2) whose inner end is bifurcated to provide the arms 100 and 102 which embrace a tension-torsion bar 104 which is anchored thereto as by a suirtable anchor pin 106. Thus, one end of the tension-torsion bar is fixed to the blade grip member 50. The opposite end of the tension-torsion bar 104 is anchored to the inner end of the tubular portion 42 of the blade carrier by means of the anchoring pin 108 so that, as shown, the bar 104 will prevent longitudinal separation between the rotor blade assembly 12 and the rotor hub assembly 10. The bearings 80, 90, 92 and 82, 94, 96 permit rotor blade assembly 12 to rotate relative to rotor hub assembly 10 for pitch change around the axis of tubular portion 42.

With regard to the modification of FIGURES 5–10, and referring at this time more particularly to FIGURE 10, a rotor mast is indicated therein by reference character 210 and the mast is suitably powered by any conventional mechanism associated with the air frame of the rotary wing aircraft to which the present invention relates. A trunnion assembly indicated generally by the reference character 212 includes a main body portion 214 having an internally splined bore 216 adapted to be engaged and fixed for rotation with the mast 210. The trunnion assembly 212 also includes a pair of diametrically opposed coaxial stub trunnions one of which is indicated by reference character 218 for providing a seesaw pivot axis for the rotor hub and blade assembly hereinafter described. Bearing cup members 220 and 222 cooperate with the stub trunnions 218, housing appropriate bearing sleeves 224 (FIGURE 5) and these cups 220 and 222 are seated within the saddle portions 226 and 228 disposed in a central portion of the hub mechanism indicated generally by the reference character 230. In the specific embodiment shown, the hub assembly 230 is provided, in its aforesaid saddle portion, with an opening 232 to clear the mast 210 and permit the aforementioned seesaw motion of the hub 230 relative to the mast 210. The assembly 230 includes flexure plate portions 234 and 236 extending in diametrically opposed directions from the central portion 238 of the assembly, it being an essential feature of this invention that these flexure plate portions 234 and 236 are of plate-like form so that their thicknesses, in the vertical direction, permit of flexure in response to forces imposed upon the rotor and blade assembly acting in directions normal to the plane of rotation of the blades; and the flexure plates 234 and 236 are wide in the plane of rotation so as to afford substantial rigidity or stiffness at this point in the plane of rotation. The outer ends of the flexure plate portions 234 and 236 are thickened and provided with bifurcated projections presenting the vertically spaced ears 240, 242 and 244, 246.

The hub assembly 230 also includes a blade grip mounting member 248 which forms in effect an extension of the respective flexure plate portions 234 and 236, only one such form 248 being shown in FIGURE 10. The mounting member 248 includes a tubular body portion 250 having, at its opposite ends, the cylindrical bearing surfaces 252 and 254, it being a feature of this invention that these two bearing surfaces 252 and 254 are of relatively small diameter so that a low profile or frontal area is presented in this region, as will more clearly appear hereinafter. The body 250 is, although of low profile, stiffer in directions normal to the plane of rotation than are the flexure plate portions 234 and 236 so that bending is confined substantially entirely to the flexure plate portion regions. At the same time, in order to preserve the rigidity in the plane of rotation which could not be afforded by reason of the relatively small diameter of the body 250 alone, the body 250 is provided with web means which, in the specific instance shown, comprises the truss-like structure provided by the arms 256 and 258 and the intervening strut 260 and the diagonal brace 262. This web means is disposed generally in the plane of rotation, parallel to the corresponding flexure plate portion 236 and on one side of the body 250, extending along the mast thereof between the opposite end portions 252 and 254. The body 250 is also provided with an oppositely extending attachment leg 264. The members 256 and 264 are provided with openings 266 and 268 adapted to be registered with the openings 270 and 272 in the ears 240, 242, 244 and 246 for the reception therethrough of suitable attachment bolts 274 and 276 (FIGURE 7) whereby the assemblies 248 are rigidly joined to their respective flexure plate portions 234 and 236.

A bearing block member 278 is journalled on the cylindrical bearing surface 252 of the body 250 and this bearing block 278 is straddled by and joined to the projections 280 and 282 of the blade grip assembly indicated generally by the reference character 284. The body 286 of the blade grip assembly 284 is generally of channel or trough-like configuration presenting the upper and lower legs 288 and 290 and the intervening bight 292 (FIGURE 8) with the legs 288 and 290 being spaced apart sufficiently to clear the body 250 of the assembly 248 and permit of relative movement therebetween pivotally about the axis defined by the bearing surfaces 252 and 254. The body 286 is provided with a transverse wall portion 294 (FIGURE 5) extending between the legs 288 and 290 and having a cylindrical boss portion 296 (FIGURE 5) serving to retain a suitable bearing sleeve 298 which is seated upon the aforementioned cylindrical bearing surface 254 of the body 250. Thus, the bearing block 278 and the bearing hub 296 serve to establish pivotal connection between the assemblies 248 and 284. The arrangement of parts is such that the axis defined by the pivotal connection between these two members intersects the axis of rotation of the mast 210 and establishes the pitch change axis for the respective blades. It is to be noted that the profile or frontal area afforded by the blade grip members 284 is also very low since the frontal area of this assembly 284 may be minimized by the minimal frontal area of the assembly 248. The body 286 is provided with a bifurcated outer end portion presenting the vertically spaced ears 300 and 302 which are adapted to straddle and receive therebetween the blade grip pad portion 304 at the root end of the associated rotor blade 306. These ears 300 and 302 and the pad portion 304 are provided with aligned apertures for receiving the blade retaining bolt 308 (FIGURE 6).

It is to be noted that the blade grip assembly 284 and especially the body 286 although of low frontal area is nevertheless of greater stiffness in directions normal to the plane of rotation than is the corresponding flexure plate portion 236 so that bending in this direction is confined to the flexure plate portion rather than to the blade grip member. At the same time, the body 286 is provided with web means to establish in-plane stiffness, the web means lying generally parallel to the blade 306 and generally oppositely extending relative to the web means associated with the body 250. In the particular instance shown, such web means for the assembly 284 may include the diagonal arms 310 and 312, such arms being provided with an aperture 314 at their juncture for connection to a drag brace 316 which extends therefrom to a trailing edge pad portion 318 of the blade 306. The drag brace 316 may take simply the form of a pair of clevises 320 and 322 and a threaded rod portion 324 upon which the clevises are engaged so that chordwise or in-plane adjustments of the blade 306 may be effected by the drag brace 316. The two clevises 320 and 322 are pinned to the member 284 and blade 306 by the respective elements 326 and 328 (FIGURE 5).

The assembly 284 is provided with a flat or land 330 against which a pitch motion control horn 332 is seated and atached for conventional pitch motions which will be well understood by those skilled in the art. With the assembly as thus described, it will be apparent that the blades are mounted to the hub assembly about pitch change axis extending longitudinally of the blades and preferably intersecting the axis of rotation of the mast 210. However, it will also be noted that the bearing connection afforded between the two assemblies 248 and 284 does not serve to axially locate the blades relative to the hub assembly 230 nor to counteract the substantial centrifugal forces involved during actual flight. The construction readily allows for the utilization of tension-torsion means whereby not only is the centrifugal loading counteracted but the blades are biased about their pitch change axes to a predetermined pitch position (i.e. zero pitch).

Thus, the tubular body 250 readily admits of the tension-torsion assembly 334 which may take the form of a multi-leaved strap 336 having eyes or openings 338 in its opposite ends. The eye 338 at one end of the strap receives a pin 340 (FIGURES 5 and 7) whereas the eye at the opposite end of the strap receives another pin 342 carried by the anchor member 344. The cap 350 is threadedly engaged on the end portion 352 of the anchor member 344 so that the flange 354 of cap 350 abuts the end face of the wall 294 (FIGURE 5) and positions the blade retaining bolt 308 at a predetermined distance from the center of the mast 210.

Upon assembly, prior to threading cap 350 on anchor member 344, assembly 284 is rotated around bearings 298 to permit key 346 to be placed into accepting keyways in grip 310 and anchor member 344, thus establishing a fixed relationship between assembly 284 and the anchor member 344. In this manner, it is clear that the tension-torsion member 336, connected to anchor member 344 through pin 342, is positioned with respect to the grip 284 and blade 306 so as to apply different moments on the blade in different blade pitch angles, depending upon the positioning of the keyways in grip 310 and anchor member 344.

Locking tab 356 which is splined to the outside shoulder of cap 350 and secured to wall 294 by fastening element 358, serves to prevent cap 350 from threading on or off anchor member 344. In order to prevent bolt 308 and blade 306 from moving outboard from its predetermined position as a result of centrifugal force imposed by rotor rotation and the unavoidable presence of slop and compressions in the numerous attaching members, plate 357 is bolted on locking tab 356 and engaged against the flange of cap 350 which is of greater depth than locking blade 356.

It will be noted that the pin 340 is carried by the body 250 so that the corresponding end of the strap 336 is anchored thereto whereas the anchor member 344 is affixed to the blade grip assembly 284 by means of a key member 346 (FIGURE 10) which is received in a groove 348 (FIGURE 9) in the anchor member 344 and a corresponding groove is provided in the cap 350.

Referring to the modification of FIGURE 11, the reference character 410 indicates the usual drive shaft rotor associated with a rotary wing aircraft and the reference character 412 indicates in general a rotor hub assembly connected to the mast 410. A trunnion device 414 is splined or otherwise fixed for rotation with the mast 410 and is provided with stub trunnion portions 416 and 418 defining a seesaw pivot axis for the hub 412. To this end, the central portion 420 of the hub assembly 412 is provided with a pair of bearing blocks 422 and 424 fixed thereto as by fasteners 426 and 428 receiving the stub trunnions 416 and 418, substantially as shown. On either side of the central portion 420, the hub assembly 412 is provided with flexure plate extensions or portions 430 and 432 which are of plate-like configuration and are disposed substantially in the plane of rotor hub rotation and oriented as to provide substantial rigidity in the plane of rotation but providing substantial flexibility in directions normal to the plane of rotation. On the other end of each of the flexure plate portions 430 and 432 are blade grip mounting extensions 434 and 436 (see FIGURE 16), each of which is provided with an elongate tubular body portion 438. It is to be noted that the body portions 438 are of minimum profile so as to present a low frontal area in the plane of rotor rotations. At the same time, these body portions are materially more rigid in directions normal to the plane of rotation than are the portions 430 and 432 so that bending is confined substantially entirely within the aforesaid portions 430 and 432. The bodies 438 are provided with web means in the plane of rotation to provide rigidity for the blade grip mounting extensions in this directions, such web means taking the form, in the specific embodiment shown, of the thickened web portions 440 and 442.

The anchor member 444 forms a part of the blade grip mounting extension assembly and, as is shown, includes a tubular portion 446 received within the associated tubular body portion 438 and having an enlarged head portion 448 providing a stop shoulder bottoming against the body 438 and presenting a cylindrical bearing surface exteriorly and at one end of the body 438. The body 438 is provided at its opposite end with a cylindrical bearing portion 450 and the two bearing portions 448 and 450 cooperate to provide coaxial bearings by means of which the blade grip assembly 452 is pivotally mounted to the extensions 434 and 436 for pivotal motion relative thereto preferably about the axis intersecting the axis of the mast 410 to thereby afford the pitch change motions of the associated blades, one of which is indicated generally by the reference character 454.

As can be seen more clearly from FIGURE 16, each of the blade grip members 452 includes a main body portion 456 of elongate channel shape configuration presenting the upper and lower legs 458 and 460 interconnected by the bight portions 462 with the legs 458 and 460 straddling the associated tubular body portion 438.

The legs 458 and 460 are provided with extensions 464 and 466 which receive a bearing block member 468 therebetween and which bearing block member is secured thereto as by fasteners 470. The bearing block 468 is provided with a bearing sleeve 472 cooperating with the bearing portion 448 of the anchor member 444 and the body 456 is provided with a cylindrical boss portion carrying the bearing sleeve 476 cooperable with the bearing portion 450 of the associated body 438. Adjacent the boss portion is a transverse end wall 478 through which the anchor member 480 projects. The anchor members 444 and 480 are provided respectively with notches 482 and apertures 484 for the reception of pins by means of which the tension-torsion strap 486 is secured thereto. A cap member 490 is threadedly engaged with an end portion of the anchor member 480 and the anchor member 480 is provided with grooves or keyways 492 cooperable with a key member 494 carried by the blade grip member 452 so as to locate the anchor member 480 rotationally so as to pre-torsion the strap 486. A suitable locking member 496 is carried by the member 452 to lock the cap 490 in place. The cap 490 is utilized to remove axial end play between the members 434 or 436 and 452. The blade grip members 452 are provided with blade grip extensions 498 and 500 which straddle the blade grip pad portion 502 of the associated blades 454 and are apertured in registry with the apertures in the blades 454 to receive anchor pins 504 serving to retain the blades affixed to the blade grips. The blade grip members 452 are rigid in directions normal to the plane of rotation commensurate with the rigidity of the mounting extensions 434 and 436 and the members 452 are of greater rigidity in the plane of rotation than they are in directions normal thereto as achieved by the web portions 508 thereof. The web portions also provide an anchor point for the strut devices 510 which extend therefrom to trailing edge grip pad portions 512 on the rotary wings 454. The strut device 510 in each case may comprise a pair of clevises 514 and 516 joined by a threaded rod portion 518 to adjust the blades 454 in the lead-lag direction, suitable pins 520 being provided to anchor the clevises to the respective members.

The forms of the invention shown in FIGURES 5–10 and FIGURES 11–16 are production embodiments designated as models 500 and 540 respectively and are constructed within the following design parameters:

|  | Model 500 | Model 540 |
|---|---|---|
| Gross Weight, lbs | 3,400 | 8,500 |
| Load Factor, G's | 2.5 | 2.5 |
| Tip Speed, f.p.s. | 691 | 744 |
| Rotor Diameter, ft | 37.2 | 44.0 |
| Blade Chord, in | 13.0 | 27.0 |
| Number of Blades | 2 | 2 |

These rotor systems exhibit the following stiffnesses (expressed as ($10^6$ lb.-in.$^2$), at the locations designated.

|  | Model 500 | | Model 540 | |
|---|---|---|---|---|
|  | Beamwise | Chordwise | Beamwise | Chordwise |
| Blade Mid Span | 5.6 | 233 | 31.95 | 2,380 |
| Blade Root | 25.0 | 800 | 92.7 | 4,719 |
| Bearing Area | 41.0 | 880 | 694.0 | 6,090 |
| Flexure Plate | 3.25 | 1,310 | 8.2 | 4,185 |

From the above, it will be apparent that the bearing area in each case represents that portion of the rotor system which possesses the greatest beamwise stiffness, greater even that the blade root area. The reason for this is that it is desirable to minimize beamwise distortion in the bearing area which might otherwise produce misalignment, binding and undue wear on the pitch change bearings. At the same time, the flexure plate in each case is a great deal softer (less stiff) beamwise than the bearing area, the blade root, or the blade mid span so that beamwise deflections which may occur are confined predominantly within the flexure plate. In this way, the pitch change bearing area and its corresponding blade will remain in beamwise alignment (i.e. straight and not bowed) to minimize feedback forces acting on the pitch change control mechanism.

Likewise, it may be seen that in each case, the chordwise stiffness of the bearing area is many times greater than its beamwise stiffness, indicating that these two stiffnesses are largely independent of each other so that the requisite degree of beamwise stiffness may be obtained within the confines of acceptable in-plane profile of this area, without forming a limiting factor on the chordwise stiffness characteristics. As has been illustrated and described, this independence of beamwise and chordwise stiffness is achieved by disposing the rotor hub extensions predominantly in chordwise side-by-side relation to the blade attachment portions. These portions are minimized as to chordwise overlap and where it does occur, it is confined to a chordwise area or region very close to the pitch change axis established between these portions. In this way, the required degree of pitch change motion may be achieved without necessitating excessive in-plane height or profile. This relationship may be better appreciated by reference to FIGURES 7–9 or FIGURES 13–15. Thus, in FIGURE 13, the in-plane profile or height between the surfaces $a$ and $b$ can be minimized and yet obtain sufficient clearance as at $c$ and $d$ (FIGURE 14) to allow for the requisite positive and negative pitch change movements because the two portions 436 and 452 are relatively movable about the axis $e$ and do not overlap chordwise to any great extent. That a similar situation prevails with the Model 500 may be seen by inspection of FIGURES 7–9 wherein the reference characters $a$–$e$ are used in the above sense. In FIGURES 7–9, however, it will be noted that the clearances $c$ are very much less than the clearances $d$; the reason being that for this particular construction, the webs 188 and 190 had to be "twisted" when the blade is in zero pitch position as shown so as to allow great enough clearance ($d$) for positive pitch change. This may be done as shown, at the expense of negative pitch change clearances $c$ because the positive pitch change requirements greatly exceed those of negative pitch change.

In any event, chordwise overlap is minimized so that the required degrees of positive and negative pitch change may be accommodated without requiring the beamwise height or thickness to become excessive. It is desirable that the bearing area constitute the region of greatest beamwise stiffness and that its chordwise stiffness be at least about as great as that of the blade root to which it is immediately adjacent. When the flexure plate principle is used, it should be of substantially less beamwise stiffness than either the bearing area or the blade root to allow the bearing area and blade to remain essentially straight and in alignment even though substantial deflection occurs in the flexure plate itself.

Whereas only one form of the invention has been illustrated and described in detail hereinabove, it will be understood that various changes may be made therein without departing from the spirit of the invention or the scope of the following claims.

We claim:
1. In a rotary wing aircraft, in combination,
a plurality of rotor blades,
a rotor driving member,
a rotor hub having a central portion attached to said rotor driving member and a blade-mounting extention for each of said rotor blades,
each rotor blade having an elongate inner end portion disposed at least predominantly in chordwise side-by-side relation to a corresponding blade-mounting extention,
bearing means pivotally connecting each blade-mounting extension to an inner end portion of a corresponding rotor blade about an axis extending longitudinally with respect to the corresponding rotor blade.

2. In a rotary wing aircraft, in combination,
a plurality of rotor blades having predetermined chordwise widths and beamwise thicknesses to provide chordwise stiffness which is several times greater than the beamwise stiffness,
a rotor driving member,
a rotor hub having a central portion attached to said rotor driving member and a blade-mounting extension for each of said rotor blades,
each rotor blade having an elongate inner end portion disposed at least predominantly in chordwise side-by-side relation to a corresponding blade-mounting extension,
bearing means pivotally connecting each blade-mounting extension to an inner end portion of a corresponding rotor blade about an axis extending longitudinally with respect to the corresponding rotor blade,
the combined chordwise stiffness of said hub and inner end of each blade being continuously and uninterruptedly of a magnitude much greater than the beamwise stiffness of the hub, the hub having a region immediately adjacent the juncture between each blade-mounting extension and the central portion of the hub which is of materially less beamwise stiffness than the combined beamwise stiffness of each blade inner end portion and blade-mounting extension.

3. In a rotary wing aircraft, in combination,
a plurality of rotor blades having main bodies of chordwise widths and beamwise thicknesses to provide substantially greater resistance to chordwise bending than to beamwise bending,
a rotor driving member, a rotor hub having a central portion attached to said rotor driving member and an elongate blade-mounting extension for each rotor blade, each rotor blade having an elongate inner end forming a rigid inner extension thereof, each such inner end being disposed at least predominantly in chordwise side-by-side relation to a corresponding blade-mounting extension of the rotor hub, and bearing means pivotally joining each blade-mounting extension to its corresponding blade inner end adjacent the opposite extremities of their side-by-side related portions as aforesaid, and along an axis which extends longitudinally with respect to the corresponding rotor blade, each blade inner end and its corresponding blade-mounting extension cooperating through said bearing means to provide resistance to chordwise bending of a magnitude substantially greater than its resistance to beamwise bending.

4. In a rotary wing aircraft, in combination,
a plurality of rotor blades having predetermined chordwise widths and beamwise thicknesses to provide substantially greater resistance to chordwise bending than to beamwise bending,
a rotor driving member,
a rotor hub having a central portion attached to said rotor driving member, an elongate blade-mounting extension for each rotor blade, and a flexure plate portion joining each blade-mounting extension to said central portion of the rotor hub, each flexure plate portion having a beamwise thickness to provide resistance to beamwise bending which is materially less than its resistance to chordwise bending,
an elongate blade grip at the inner end of each rotor blade and forming a rigid inner extension thereof, each blade grip being disposed at least predominantly in chordwise separated and side-by-side relation to a corresponding blade-mounting extension of the rotor hub,
and bearing means pivotally joining each blade-mounting extension to its corresponding blade grip adjacent the opposite extremities of their side-by-side related portions as aforesaid, and along an axis which extends longitudinally with respect to the corresponding rotor blade and in close adjacency to the plane of separation between the corresponding blade-mounting extension and blade grip,
each blade grip and its corresponding blade-mounting extension cooperating through said bearing means to provide an effective chordwise width sufficient to produce resistance to chordwise bending of a magnitude substantially greater than their resistance to beamwise bending.

5. In a rotary wing aircraft, in combination,
a plurality of rotor blades having predetermined chordwise widths and beamwise thicknesses to provide substantially greater resistance to chordwise bending than to beamwise bending,
a rotor driving member,
a rotor hub having a central portion attached to said rotor driving member, an elongate blade-mounting extension for each rotor blade, and a flexure plate portion joining each blade-mounting extension to the central portion of said rotor hub,
an elongate blade grip at the inner end of each rotor blade and forming an extension thereof, each blade grip being disposed at least predominantly in chordwise side-by-side relation with a corresponding blade-mounting extension,
and bearing means pivotally joining each blade grip to its corresponding blade-mounting extension along an axis extending longitudinally with respect to the corresponding rotor blade,
each flexure plate, and each blade-mounting extension and its corresponding blade grip as joined by their corresponding bearing means being of effective chordwise width continuously and throughout their lengths providing resistance to chordwise bending which is substantially greater than their resistance to beamwise bending.

6. In a rotary wing aircraft, in combination,
a plurality of rotor blades, each having predetermined chordwise width and beamwise thickness to provide a predetermined ratio of chordwise-to-beamwise stiffness in which the chordwise stiffness is several times greater than the beamwise stiffness,
a rotor driving member,
a rotor hub having a central portion attached to said rotor driving member and a blade-mounting extension for each of said rotor blades,
each rotor blade having an elongate inner end portion disposed in chordwise side-by-side relation to a corresponding blade-mounting extension,
bearing means pivotally connecting each blade-mounting extension to an inner end portion of a corresponding rotor blade about an axis extending longitudinally with respect to the corresponding rotor blade and fixing each blade-mounting extension with respect to its corresponding blade inner end portion such that only (a) the extremity of each blade inner end portion and a portion of the corresponding blade-mounting extension adjacent the central portion of the hub, (b) the extremity of each blade-mounting extension and a portion of the corresponding blade inner end adjacent the blade main body, and (c) adjacent side edges of each blade-mounting extension and blade inner end, are disposed in overlapped relation when viewed perpendicular to the chordwise plane,
the chordwise stiffness of said hub and inner end of each blade being of a magnitude much greater than the beamwise stiffness of the hub and blade, the hub having a region immediately adjacent the juncture between each blade-mounting extension and the central portion of the hub which is of materially less beamwise stiffness than the remaining portion of the hub.

7. In a rotary wing aircraft, in combination,
a rotor hub having a central portion for attachment to drive means, and a plurality of blade-mounting extensions,
a plurality of blade members, each having a main body portion and an attachment portion at its inner end, each main body portion being of aerodynamic cross section and having predetermined chordwise and beamwise stiffness adjacent its attachment portion in which the chordwise stiffness thereof is many times greater than the beamwise stiffness thereof,
bearing means pivotally connecting each blade member to a corresponding rotor hub blade-mounting extension for pivotal motion relative thereto only about a pitch change axis extending longitudinally of the blade member.
each attachment portion being disposed predominantly on one chordwise side of said pitch change axis and each corresponding rotor hub blade-mounting extension being disposed predominantly on the other chordwise side of said pitch change axis to form, with said bearing means, a bearing area joining each blade member to the rotor hub, each bearing area having chordwise dimensions substantially greater than its beamwise dimensions to provide substantially greater chordwise stiffness than beamwise stiffness.

8. A rotor system for rotary wing aircraft comprising, in combination,
a rotor hub assembly having a plurality of extensions,
a rotor blade for each of said extensions,
blade grips connecting said blades to said extensions for pivotal movement relative thereto only about longitudinal pitch change axes of said blades, and means for rotating said hub assembly to carry said blades in a circular path, said blade grips and the extremities of said extensions being overlapped in a direction longitudinally of each respective blade and in side-by-side relation within the plane of said path, said blade grips and the extremities of the extensions being of substantially greater dimensions in the transverse direction, relative to each blade, within the plane of said path than in the transverse direction perpendicular to the plane of said path.

9. In a rotary wing aircraft, in combination, a plurality of rotor blades, a rotor driving member, a rotor hub having a central portion attached to said rotor driving member and a blade-mounting extension for each of said rotor blades, means for rotating said hub to carry said blades in a circular path, each rotor blade having an elongate inner end portion for attachment to a corresponding blade-mounting extension, bearing means pivotally connecting each blade-mounting extension to an inner end portion of a corresponding rotor blade about an axis extending longitudinally with respect to the corresponding rotor blade, and positioning the blade-mounting extension and rotor blade inner end portion such that one lies predominantly on one side of said axis within the plane of said circular path and the other lies predominantly on the other side of said axis within the plane of said circular path.

10. In a rotary wing aircraft, in combination, a plurality of elongate rotor blades, each having predetermined chordwise width and beamwise thickness such that each blade exhibits substantially less resistance to beamwise bending than it does to chordwise bending, a rotor driving member, a rotor hub having a central portion attached to said rotor driving member for rotation thereby, said rotor hub also having an elongate blade-mounting extension for each of said rotor blades and a flexure plate portion joining such extension to said central portion of the rotor hub, each flexure plate portion being of predetermined chordwise width and each blade-mounting extension having a base portion joined to the outer end of a corresponding flexure plate portion and which is of a chordwise width at least about as wide as said corresponding flexure plate portion, each blade-mounting extension having an elongate free end portion projecting from its base portion which is of less chordwise width than such base portion, a blade grip assembly for each rotor blade, each blade grip assembly including a base portion joined to a corresponding rotor blade and of a chordwise width at least about as great as the chordwise width of a corresponding flexure plate portion of the rotor hub, and each blade grip assembly also including an inner free end portion which is narrow in the chordwise direction as compared to the corresponding base portion of the blade grip assembly, a first bearing member secured to the base portion of each blade-mounting extension, a second bearing member secured to the base portion of each blade grip assembly, said inner free end of each blade grip member also being secured to a corresponding one of said first bearing members and the outer extremity of said free end portion of each blade-mounting extension of the rotor hub also being secured to a corresponding one of said second bearing members with the pivotal axes established thereby extending longitudinally of the corresponding rotor blades, the positioning of said bearing members relative to the blade-mounting extensions and the blade grip assemblies being such as to (a) minimize chordwise overlap therebetween to thus allow a maximum of pivotal motion therebetween as aforesaid and (b) join each blade-mounting extension to a corresponding blade grip assembly so that their cumulative resistance to chordwise bending throughout the area between their respective base portions is at all points of about the order of the resistance to chordwise bending exhibited by a corresponding rotor blade, the beamwise thicknesses of said blade-mounting extensions and of said blade grip assemblies being such as to cumulatively exhibit therethroughout a resistance to beamwise bending which is in the order of the resistance to beamwise bending exhibited by a corresponding rotor blade, and the beamwise thickness of each flexure plate portion being such as to exhibit resistance to beamwise bending which is materially less than the resistance to beamwise bending exhibited by a corresponding rotor blade.

11. In a rotary wing aircraft, in combination, a rotatable mast, a rotor hub assembly connected to said mast for rotation therewith and for seesaw motion relative thereto, said hub assembly including a central mounting portion connected to said mast as aforesaid, a plurality of flexure plate portions projecting radially from said central portion and disposed flatwise in the plane of rotation of said hub assembly, and a blade mounting portion for each of said flexure plate portions, each blade mounting portion being elongate to define inner and outer ends with the inner end being joined to and commensurate in width with the corresponding flexure plate portion, a rotor blade for each of said extensions and having an inner end portion for attachment thereto, each such inner end portion being elongate and being of greater width in the plane of rotation than of thickness perpendicular to such plane of rotation, and bearing means joining each extension to a corresponding rotor blade inner end portion for pivotal motion about an axis extending longitudinally of the corresponding blade and fixing these entities to lie predominantly on opposite sides, with respect to the plane of rotation, of said axis established by the bearing means.

12. In a rotor comprising, a rotor driving member, a hub member attached to said rotor driving member and rotatively driven thereby, a grip member, attachment means connecting said grip member and said hub member in side-by-side relation in the plane of rotation of the hub member, said attachment means consisting of bearing elements establishing a pivotal axis between said members extending radially with respect to said rotor driving member.

13. In a rotary wing aircraft, in combination, a plurality of elongate rotor blades, each of predetermined width and length, a rotor driving member, a rotor hub having a central portion attached to said rotor driving member, said rotor hub also having an elongate blade-mounting extension for each of said rotor blades, each blade-mounting extension having a base portion joined to the central portion of the hub and an elongate outer end portion projecting from the base portion, a blade extension for each rotor blade, each blade extension having a base portion joined to a corresponding rotor blade and an inner end portion projecting from the base portion, a first bearing member secured to the base portion of each blade-mounting extension,
a second bearing member secured to the base portion of each blade extension,
said inner end portion of each blade extension also being secured to a corresponding one of said first bearing members and said outer end portion of each blade-mounting extension being secured to a corresponding one of said second bearing members with the pivotal axis established thereby extending longitudinally of the corresponding rotor blade, said bearing members being positioned to minimize overlap between the blade-mounting extension and the blade extensions in the widthwise direction thereof.

14. In a rotary wing aircraft, in combination,
a plurality of elongate rotor blades,
a rotor driving member,
a rotor hub having a central portion attached to said rotor driving member for rotation thereby, said rotor hub also having an elongate blade-mounting extension for each of said rotor blades, each blade-mounting extension having a base portion joined to said central portion of the hub and which is of predetermined width, each blade-mounting extension having an elongate free end portion projecting from its base portion which is of less width than such base portion,
a blade extension for each rotor blade, each blade extension including a base portion joined to a corresponding rotor blade and of a width commensurate with that of a corresponding base portion of the rotor hub, and each blade extension also including an inner free end portion which is of less width than the corresponding base portion of the blade extension,
a first bearing member secured to the base portion of each blade-mounting extension,
a second bearing member secured to the base portion of each blade extension,
said inner free end of each blade extension also being secured to a corresponding one of said first bearing members and the outer extremity of said free end portion of each blade-mounting extension of the rotor hub also being secured to a corresponding one of said second bearing members with the pivotal axis established thereby extending longitudinally of the corresponding rotor blades, the positioning of said bearing members relative to the blade extensions and the blade-mounting extensions being such as to (a) minimize overlap between the blade extensions and the blade-mounting extensions in the widthwise direction thereof and (b) join each blade-mounting extension to a corresponding blade extension so that their cumulative resistance to widthwise bending is at all points of about the order of the resistance to widthwise bending exhibited by a corresponding base portion of the rotor hub.

15. In a rotary wing aircraft, in combination,
a plurality of rotor blades,
a rotor driving member,
a rotor hub having a central portion attached to said rotor driving member and a blade-mounting extension for each of said rotor blades, each blade-mounting extension being of predetermined width and thickness,
each rotor blade having an elongate inner end portion of predetermined width and thickness,
each blade inner end portion being disposed in substantially side-by-side relation with a corresponding blade-mounting extension to provide a combined width which is substantially the sum of their individual widths,
and bearing means joining each blade mounting extension directly to a corresponding blade inner end portion for pivotal motion about an axis extending longitudinally of the corresponding blade.

16. In a rotary wing aircraft, in combination,
a plurality of rotor blades,
a rotor driving member for rotating said blades in a circular path,
a rotor hub having a central portion attached to said rotor driving member and a blade-mounting extension for each of said blades, each such extension having a width dimension in the direction of said circular path, a length dimension radially of said circular path, and a thickness dimension in the direction normal to the plane of said circular path,
each blade having an inner attachment portion, each such attachment portions having width, thickness and length dimension in the directional senses as stated aforesaid for said blade-mounting extensions,
each blade inner attachment portion lying both in lengthwise staggered relation and in widthwise side-by-side relation to a corresponding blade-mounting extension,
and bearing means joining each blade inner attachment portion directly to a corresponding blade-mounting extension for pivotal motion about a lengthwise axis extending between proximal portions of such members.

17. In a rotary wing aircraft, in combination,
a plurality of rotor blades,
a rotor driving member,
a rotor hub having a central portion attached to said rotor driving member, said rotor hub also having an elongate blade-mounting hub extension for each of said rotor blades, each blade-mounting hub extension having a base portion joined to the central portion of the hub and an elongate body portion projecting from the base portion,
a blade extension for each rotor blade, each blade extension having a base portion joined to a corresponding rotor blade and a body portion projecting from the base portion,
first and second bearings mutually carried in spaced-apart axially aligned relation by said body portions thereby mounting each of said blades upon said hub to rotate about a pivotal axis,
the structures of said body portions in the case of each blade-hub mounting being principally offset chordwise from said pivotal axis in opposite directions.

References Cited by the Examiner

UNITED STATES PATENTS

| | | | |
|---|---|---|---|
| 2,580,363 | 12/1951 | Schnitt | 170—159 |
| 2,689,011 | 9/1954 | Zakhartchenko | 170—160.27 |
| 2,829,721 | 4/1958 | Gebhard. | |
| 2,830,669 | 4/1958 | Klockner. | |
| 2,845,131 | 7/1958 | Laufer | 170—160.26 X |
| 2,949,965 | 8/1960 | De Tore et al. | 170—160.25 |
| 2,961,051 | 11/1960 | Wilford et al. | 170—160.26 X |
| 3,026,942 | 3/1962 | Cresap | 170—160.53 X |
| 3,077,934 | 2/1963 | Hartswick | 170—160.25 |
| 3,193,018 | 7/1965 | Gandy | 170—160.26 X |

FOREIGN PATENTS 983,938  2/1951  France
751,109  6/1956  Great Britain.

MARTIN P. SCHWADRON, Primary Examiner.
SAMUEL LEVINE, Examiner.
E. A. POWELL, Assistant Examiner.